United States Patent
Kawahara et al.

(10) Patent No.: US 10,202,122 B2
(45) Date of Patent: Feb. 12, 2019

(54) DEVICE FOR CONTROLLING A VEHICLE

(71) Applicant: MAZDA MOTOR CORPORATION, Hiroshima (JP)

(72) Inventors: Naoto Kawahara, Hiroshima (JP); Ryoji Haruna, Hiroshima (JP); Lipeng Chou, Hatsukaichi (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 8 days.

(21) Appl. No.: 15/695,388

(22) Filed: Sep. 5, 2017

(65) Prior Publication Data

US 2018/0065638 A1    Mar. 8, 2018

(30) Foreign Application Priority Data

Sep. 8, 2016    (JP) .................................. 2016-175943

(51) Int. Cl.
*B60W 30/18* (2012.01)
*B60W 10/06* (2006.01)
*B60W 10/184* (2012.01)
*B60W 50/14* (2012.01)

(52) U.S. Cl.
CPC ...... *B60W 30/18118* (2013.01); *B60W 10/06* (2013.01); *B60W 10/184* (2013.01); *B60W 50/14* (2013.01); *B60W 2050/146* (2013.01); *B60W 2520/04* (2013.01);
(Continued)

(58) Field of Classification Search
CPC ............... B60W 10/06; B60W 10/184; B60W 30/18118; B60W 50/15; B60W 2050/146; B60W 2520/04; B60W 2520/105; B60W 2540/10; B60W 2540/12; B60W 2550/142

See application file for complete search history.

(56) References Cited

U.S. PATENT DOCUMENTS

| 6,346,064 B1* | 2/2002 | Hada ..................... B60K 6/543 |
| | | 477/171 |
| 8,843,272 B2* | 9/2014 | Okita ..................... B60W 30/20 |
| | | 701/36 |
| 2010/0198449 A1 | 8/2010 | Ueoka et al. |

(Continued)

FOREIGN PATENT DOCUMENTS

| JP | 2003-002087 A | 1/2003 |
| JP | 2009-071979 A | 4/2009 |

(Continued)

*Primary Examiner* — Rachid Bendidi
(74) *Attorney, Agent, or Firm* — Studebaker & Brackett PC

(57) ABSTRACT

Disclosed herein is a device for controlling a vehicle. The device includes: a driving operation evaluator; a brake device controller for executing a brake hold control if a predetermined brake hold condition is met while the vehicle is stationary; and a threshold modifier. The driving operation evaluator evaluates driver's operation of the vehicle positively if an evaluation target value is equal to or less than a predetermined threshold value, or otherwise negatively if the evaluation target value is more than the predetermined threshold value. When the accelerator pedal is depressed in a situation where the brake hold control is being executed while the vehicle is stationary, the threshold modifier increases the predetermined threshold value for a predetermined period since the driver started to depress the accelerator pedal.

16 Claims, 12 Drawing Sheets

(52) U.S. Cl.
CPC ... *B60W 2520/105* (2013.01); *B60W 2540/10* (2013.01); *B60W 2540/12* (2013.01); *B60W 2550/142* (2013.01)

(56) References Cited

U.S. PATENT DOCUMENTS

| | | |
|---|---|---|
| 2014/0018974 A1 | 1/2014 | Okita et al. |
| 2014/0350816 A1* | 11/2014 | Tahara .................... B60T 7/042 701/70 |
| 2016/0257287 A1* | 9/2016 | Kato ........................ B60T 7/12 |

FOREIGN PATENT DOCUMENTS

| | | |
|---|---|---|
| JP | 2010-152453 A | 7/2010 |
| JP | 5796315 B2 | 10/2015 |

* cited by examiner

DEVICE FOR CONTROLLING A VEHICLE

CROSS-REFERENCE TO RELATED APPLICATIONS

This application claims priority to Japanese Patent Application No. 2016-175943 filed on Sep. 8, 2016, the entire disclosure of which is hereby incorporated by reference.

BACKGROUND ART

The present disclosure relates to a device for controlling a vehicle. The device evaluates a driving operation of a driver of a vehicle, and shows the result of the evaluation on a display.

A device which evaluates a driving operation of a driver of a vehicle, and shows the result of the evaluation on a display has been known, for example, as disclosed by Japanese Patent No. 5796315. This device evaluates the driving operation of the driver based on the rate of change of acceleration (jerk) of the vehicle.

Japanese Unexamined Patent Publication No. 2003-002087 discloses a brake hold system. This system performs a brake hold control by allowing a brake device of the vehicle to keep braking even if a brake pedal of the vehicle is not depressed while a vehicle is stationary, and by allowing the brake device to stop braking when the driver depresses an accelerator pedal of the vehicle.

SUMMARY

It is possible to evaluate, as disclosed by Japanese Patent No. 5796315, an operation of a driver who drives a vehicle with a brake hold system just like the one disclosed by Japanese Unexamined Patent Publication No. 2003-002087.

However, if the driver depresses the accelerator pedal to start the vehicle with the brake hold system while the brake hold control is being executed, the acceleration of the vehicle tends to rise more steeply than when the accelerator pedal of the vehicle with the brake hold system is depressed to the same extent while the brake hold control is not being executed, or when an accelerator pedal of a vehicle without the brake hold system is depressed to the same extent.

Specifically, suppose that a vehicle does not have the brake hold system (but has an automatic transmission). If the driver stops depressing the brake pedal to start the vehicle that is stationary with a shift lever set in a drive position (in particular in a D position), i.e., when the automatic transmission is in a power transmission state, the vehicle starts to move forward due to creep torque of the automatic transmission. Thus, the acceleration rises in two phases after the vehicle has started, i.e., it first rises due to the creep torque, and subsequently rises responsive to the depression of the accelerator pedal by the driver. The same is applied to the case where the accelerator pedal of the vehicle provided with the brake hold system is depressed to start the vehicle while the brake hold control is not being executed.

In contrast, if the vehicle with the brake hold system executes the brake hold control when the driver stops depressing the brake pedal, the vehicle does not move forward due to the creep torque of the automatic transmission. Thus, when the vehicle starts, the acceleration rises only in a single phase responsive to the depression of the accelerator pedal by the driver. As a result, when the driver depresses the accelerator pedal to start the vehicle while the brake hold control is being executed, the acceleration of the vehicle tends to rise steeply.

Thus, if the driving operation of the driver is evaluated when the driver depresses the accelerator pedal to start the vehicle while the brake hold control is being executed, the device may determine that the driver abruptly depressed the accelerator pedal even if he or she actually did not do so. Then, the device tends to show negative evaluation result on the display about his or her driving operation. The negative evaluation result shown on the display may dissatisfy the driver because he or she did not intend to abruptly depress the accelerator pedal.

In view of the foregoing background, it is therefore an object of the present disclosure to provide a device for controlling a vehicle, which can reduce the possibility that a driver of the vehicle is dissatisfied with the results of evaluation of the driver's operation when he or she depresses the accelerator pedal to start the vehicle while a brake hold control is being executed.

To achieve the object, the present disclosure provides a device for controlling a vehicle as described below.

The device for controlling a vehicle includes: a driving operation evaluator configured to evaluate a driver's operation of the vehicle based on an evaluation target value derived from acceleration of the vehicle; a display controller configured to show the result of the evaluation by the driving operation evaluator on a display arranged in a cabin of the vehicle to be visually recognized by the driver; a brake device controller configured to execute, if a predetermined brake hold condition is met while the vehicle is stationary, a brake hold control to allow a brake device to brake wheels of the vehicle to keep braking the wheels even if a brake pedal of the vehicle is not operated, and to instruct the brake device to stop braking the wheels when the driver depresses an accelerator pedal while the brake hold control is being executed; and a power source controller configured to control operation of a power source of the vehicle based on how far the accelerator pedal is depressed, wherein the driving operation evaluator is configured to evaluate the driver's operation positively if the evaluation target value is equal to or less than a predetermined threshold value, or otherwise negatively if the evaluation target value is more than the predetermined threshold value, and the device further includes a threshold modifier configured to execute, when the accelerator pedal is depressed in a situation where the brake hold control is being executed by the brake device controller while the vehicle is stationary, a threshold modification process of increasing the predetermined threshold value for a predetermined period since the driver started to depress the accelerator pedal.

According to the configuration described above, when the accelerator pedal is depressed in a situation where the brake hold control is being executed while the vehicle is stationary, the predetermined threshold value is increased for a predetermined period since the accelerator pedal was depressed. Thus, for this predetermined period, the possibility that the driver's operation is negatively evaluated can be reduced. Consequently, when the driver depresses the accelerator pedal to start the vehicle while the brake hold control is being executed, it is less likely to happen that the driver is dissatisfied with the result of the evaluation of the driver's operation.

According to an embodiment of the device for controlling the vehicle, the power source may be an engine. The power source controller may be configured to automatically stop the engine if a predetermined auto-stop condition, including a condition that the vehicle is stationary, is met, and restart the engine when the accelerator pedal is depressed in a situation where the brake hold control is being executed by the brake device controller while the vehicle is stationary with the engine automatically stopped, and the threshold modifier is configured to execute the threshold modification process when the accelerator pedal is depressed in a situation where the brake hold control is being executed by the brake device controller while the vehicle is stationary with the engine automatically stopped.

Specifically, it takes some time to have the engine restarted completely since the accelerator pedal was depressed. Thus, when the accelerator pedal is depressed in a situation where the brake hold control is being executed while the vehicle is stationary with the engine automatically stopped, the vehicle tends to start much more abruptly. This may much more likely result in negative evaluation of the driver's operation. If the threshold modification process is performed in such a case where the evaluation particularly tends to be negative, the present disclosure particularly effectively reduces the dissatisfaction that the driver may feel.

According to another embodiment of the device for controlling the vehicle, the vehicle may include an automatic transmission. The threshold modifier may be configured to execute the threshold modification process when the accelerator pedal is depressed in a situation where the brake hold control is being executed by the brake device controller while the vehicle is stationary with the automatic transmission running in a power transmission state.

According to yet another embodiment of the device for controlling the vehicle, the threshold modifier may be configured to execute the threshold modification process when the accelerator pedal is depressed in a situation where the brake hold control is being executed by the brake device controller while the vehicle is stationary on a road, of which an uphill gradient detected by a gradient detector is less than a predetermined value.

According to still another embodiment of the device for controlling the vehicle, the threshold modifier may be configured to execute the threshold modification process when the accelerator pedal is depressed in a situation where the brake hold control is being executed by the brake device controller while the vehicle is stationary on a road, of which a downhill gradient detected by a gradient detector is equal to or more than a preset value.

As can be seen from these embodiments, in a case where the driver's operation tends to be evaluated negatively, the threshold modification process is performed to effectively reduce the dissatisfaction that the driver may feel.

DETAILED DESCRIPTION

Exemplary embodiments of the present disclosure will be described in detail with reference to the drawings.

Figure 1:
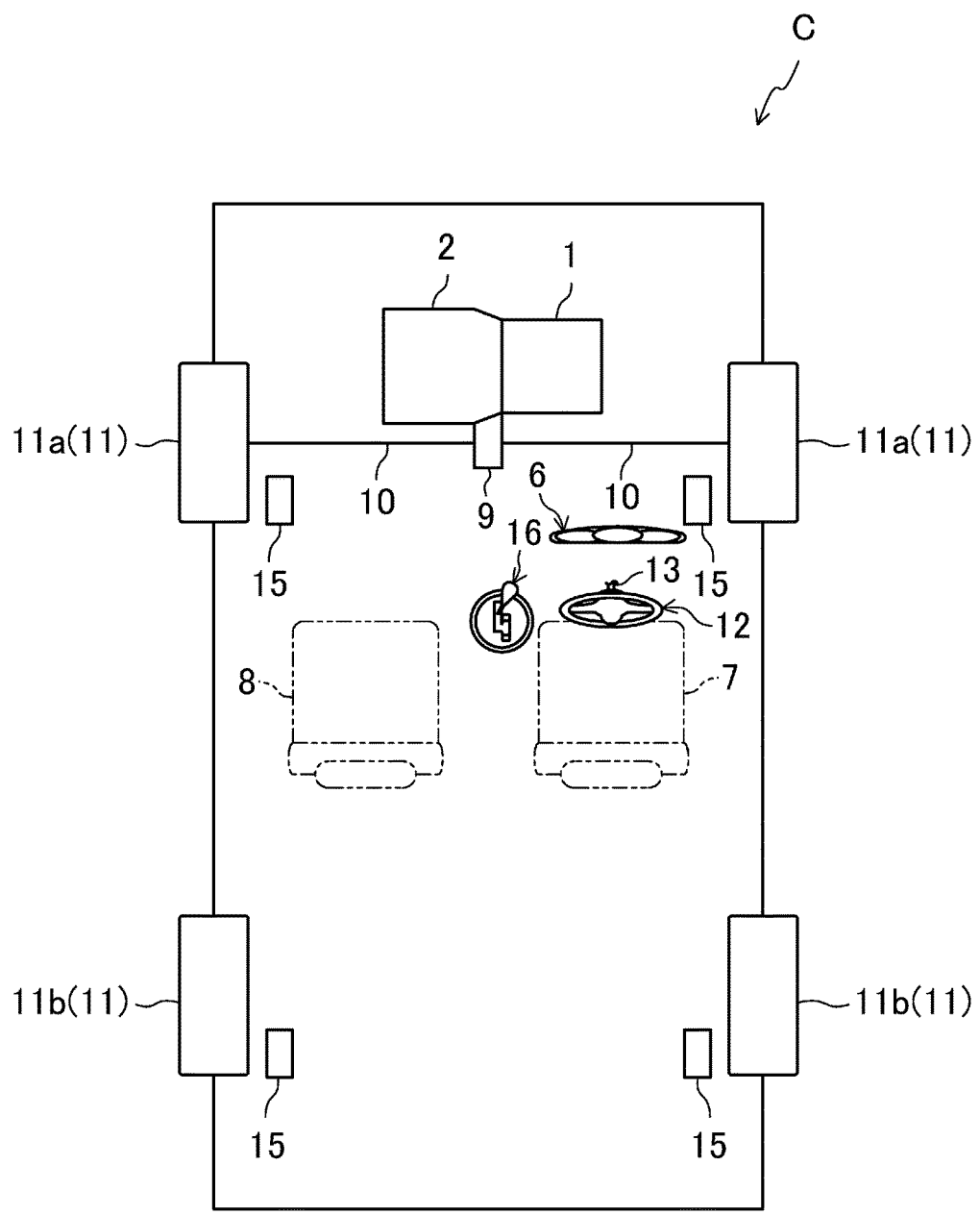
FIG. 1 schematically shows a vehicle provided with a control device according to an exemplary embodiment.

FIG. 1 shows a vehicle C (an automobile in this exemplary embodiment) provided with a control device (a control unit 20 to be described later) according to an exemplary embodiment. This vehicle C includes an engine 1 as a power source which drives the vehicle C, and an automatic transmission 2 which receives torque (power) generated by the engine 1. The engine 1 and the automatic transmission 2 are mounted in an engine compartment located in a front portion of the vehicle C. The engine 1 has an output shaft (crankshaft) which extends along the width of the vehicle (vehicle width direction), and is coupled to an input shaft (extending in the vehicle width direction) of the automatic transmission 2. The power source is not necessarily limited to the engine 1, but may be an electric motor or any other device.

Power from the automatic transmission 2 is transmitted to a differential 9, and drives right and left front wheels 11a via right and left drive shafts 10, respectively. Thus, the front wheels 11a are driving wheels which are driven by the torque (power) output from the automatic transmission 2. Therefore, the vehicle C in this exemplary embodiment is a front-wheel drive vehicle. Note that the vehicle C is not limited to the front-wheel drive vehicle, but may be a rear-wheel drive vehicle.

Brake devices 15 are respectively provided for all the wheels 11 (front wheels 11a and rear wheels 11b) of the vehicle C so that each brake device 15 brakes an associated one of the wheels 11. The brake devices 15 for the wheels 11 are operated by a hydraulic pressure exerted on the brake devices 15.

A driver's seat 7 and a passenger's seat 8 are arranged side by side in the vehicle width direction in a front portion of a cabin of the vehicle C behind the engine compartment. A shift lever 16 with which a driver of the vehicle C changes the shift range of the automatic transmission 2 is provided between the driver's seat 7 and the passenger's seat 8.

A dashboard (not shown) extending in the vehicle width direction is provided in the cabin in front of the driver's seat 7 and the passenger's seat 8 (an end of the cabin closer to the front of the vehicle). A steering column (not shown) which supports a steering shaft 13 so that the steering shaft 13 is rotatable is provided on the dashboard in front of the driver's seat 7. A steering wheel 12 which is handled by the driver of the vehicle C is attached to a rear end of the steering shaft 13 (an end closer to the rear of the vehicle).

In addition, an indicator 6 including a display 60 on which the result of evaluation to be described later is shown (see FIGS. 4 and 5) is provided on the dashboard to be located above the steering column (at a position in the cabin of the vehicle C which can be visually recognized by the driver).

The vehicle C is provided with a control unit 20 which controls, based on an input signal to be described later, the operation of the engine 1, the automatic transmission 2, the brake devices 15, and the display 60. This control unit 20 is a controller based on a commonly known microcomputer, and includes a central processing unit (CPU) which executes computer programs (including basic control programs such as OSes, and application programs which run on an OS and implement particular functions), a memory which is configured as, for example, a RAM or a ROM, and stores computer programs and data, and an input/output (I/O) bus which inputs and outputs electrical signals.

The control unit 20 is configured to receive various kinds of signals such as: a signal from an accelerator position sensor 21 which detects how much the accelerator pedal is depressed by the driver of the vehicle C (accelerator position); a signal from a wheel speed sensor 22 which is provided for each of the wheels 11 of the vehicle C to detect the speed of each wheel 11; a signal from a steering angle sensor 23 which detects the steering angle of the steering wheel 12 handled by the driver; a signal from a brake sensor 24 which detects how much a brake pedal is depressed by the driver; a signal from a gradient sensor 25 serving as a gradient detector which detects the gradient of a road on which the vehicle C is located; a signal from a range position sensor 26 which detects the range position (D, R, N, and P range positions) of the shift lever 16 of the vehicle C; and a signal from a selector switch 27 with which the driver chooses to or not to allow a brake hold control (to be described later) to be executed. The gradient sensor 25 is able to detect both of an uphill gradient and a downhill gradient of the road. The uphill and downhill gradients (%) of the road detected by the gradient sensor 25 are represented as positive and negative values, respectively.

The driving speed of the vehicle C may be obtained based on the speeds of the wheels 11 detected by the wheel speed sensors 22 provided for the wheels 11. Alternatively, another vehicle speed sensor which detects the driving speed of the vehicle C may be additionally provided.

The control unit 20 may include an engine controller 20a which serves as a power source controller for controlling the operation of the engine 1 (power source), a transmission controller 20b which controls the operation of the automatic transmission 2, a brake device controller 20c, an acceleration/jerk calculator 20d, a driving operation evaluator 20e, a display controller 20f, and a threshold modifier 20g. The engine controller 20a, the automatic transmission controller 20b, the brake device controller 20c, the acceleration/jerk calculator 20d, the driving operation evaluator 20e, the display controller 20f, and the threshold modifier 20g process, on the CPU, the signals supplied to the control unit 20 in accordance with the computer program stored in the memory, and operate as will be described below.

The engine controller 20a controls the operation of the engine 1 (i.e. torque generated by the engine 1) depending on the accelerator position detected by the accelerator position sensor 21 (how far the accelerator pedal is depressed by the driver). Specifically, depending on the accelerator position, the engine controller 20a controls the operation of various components including a throttle valve 31 provided for an intake pipe of the engine 1, fuel injection valves 32 which are provided for an engine body having a plurality of cylinders of the engine 1 and through which fuel is injected into the cylinders, and ignition plugs 33 which are provided for the engine body and ignite the fuel injected into the cylinders.

Further, the engine controller 20a automatically stops (idles) the engine 1 when a predetermined auto-stop condition, including a condition that the vehicle C is stationary (i.e., the driving speed of the vehicle C is zero), is met. In this exemplary embodiment, the predetermined auto-stop condition is met when the vehicle C is stationary and the selector switch 27 is ON (the driver allows the brake hold control to be executed), or when the vehicle C is stationary, the selector switch 27 is OFF, and the driver is depressing the brake pedal.

When the accelerator pedal is depressed in a situation where the brake hold control is being executed by the brake device controller 20c while the vehicle C is stationary with the engine 1 automatically stopped, the engine controller 20a restarts the engine 1. On the other hand, if the driver stops depressing the brake pedal (more specifically, the amount of the depression of the brake pedal becomes equal to or less than a predetermined level) in a situation where the selector switch 27 is turned OFF while the vehicle C is stationary with the engine 1 automatically stopped, the engine controller 20a restarts the engine 1.

If the range position sensor 26 detects that the shift lever is at the forward drive range position (e.g., D range position), the transmission controller 20b determines a gear position based on the driving condition of the vehicle C (more specifically, the accelerator position detected by the accelerator position sensor 21 and the driving speed of the vehicle C) using a gear shifting map previously stored in the memory of the control unit 20. Then, the transmission controller 20b instructs a plurality of frictional coupling elements 41 provided for the automatic transmission 2, including a clutch and a brake, to couple or uncouple so that the gear is shifted to the determined gear position. If the range position sensor 26 detects that the shift lever is at the forward drive range position when the vehicle C is stationary, the engine controller 20a couples or uncouples the plurality of frictional coupling elements 41 to engage the first gear. At this time, the automatic transmission 2 is in a power transmission state. Further, if the range position sensor 26 detects that the shift lever is at the R range position when the vehicle C is stationary, the engine controller 20a couples or uncouples the plurality of frictional coupling elements 41 to engage the reverse gear. At this time, the automatic transmission 2 is in the power transmission state as well.

The brake device controller 20c controls a hydraulic pressure exerted on the brake devices 15 of the wheels 11 depending on the amount of the depression of the brake pedal detected by the brake sensor 24. In addition, when a predetermined brake hold condition is met while the vehicle C is stationary, the brake device controller 20c executes a brake hold control to allow the brake devices 15 to brake all the wheels 11 of the vehicle C, even if the brake pedal of the vehicle C is not depressed. Further, when the driver depresses the accelerator pedal of the vehicle C (i.e., when the accelerator position sensor 21 detects the accelerator pedal of the vehicle C depressed) while the brake hold control is being executed, the brake device controller 20c allows the brake devices 15 in a braking state under the brake hold control to stop braking. Note that while the brake hold control is being executed, only the brake devices 15 for the driving wheels (front wheels in this exemplary embodiment) may be allowed to brake the wheels.

In this exemplary embodiment, the predetermined brake hold condition is met when the selector switch 27 is ON (the driver allows the brake hold control to be executed) and the driver stops depressing the brake pedal while the vehicle C is stationary (more specifically, the amount of the depression of the brake pedal is equal to or less than the predetermined level). Alternatively, the predetermined brake hold condition may be met when the selector switch 27 is ON, the driver stops depressing the brake pedal while the vehicle C is stationary, and the range position sensor 26 detects that the shift lever is at the drive range position, i.e., the range position at which the vehicle C may possibly be moved by the creep torque of the automatic transmission 2 (in particular, the forward drive range position).

The driving operation evaluator 20e evaluates the driver's operation based on an evaluation target value derived from the acceleration of the vehicle C (acceleration in the longitudinal direction of the vehicle C). In this exemplary embodiment, the evaluation target value is the absolute value of J/G ($s^{-1}$) where G ($m/s^2$) represents the acceleration of the vehicle C and J ($m/s^3$) represents the rate of change (jerk) of the acceleration G.

In this exemplary embodiment, the acceleration/jerk calculator 20d calculates the acceleration G based on the speed of each of the wheels 11 detected by the wheel speed sensors 22. Specifically, the acceleration/jerk calculator 20d calculates the driving speed of the vehicle C based on the speed of each of the wheels 11, and calculates the acceleration G by differentiation of the driving speed. In addition, the acceleration/jerk calculator 20d calculates the jerk J by differentiation of the acceleration G thus calculated. Then, the driving operation evaluator 20e receives the acceleration G and jerk J calculated by the acceleration/jerk calculator 20d to calculate |J/G|, thereby obtaining an evaluation target value. Note that an acceleration sensor which detects the acceleration of the vehicle C may be additionally provided so that the driving operation evaluator 20e receives the acceleration G from the acceleration sensor, instead from the acceleration/jerk calculator 20d.

In this exemplary embodiment, the driving operation evaluator 20e calculates the evaluation target value when the sign of the value obtained by differentiation of the jerk J changes, i.e., at a timing when the jerk J reaches its peak.

Every time the driving operation evaluator 20e calculates the evaluation target value at a timing when the jerk J reaches its peak, the driving operation evaluator 20e evaluates the driver's operation based on the evaluation target value thus calculated. Specifically, the driving operation evaluator 20e evaluates the driver's operation positively if the calculated evaluation target value is equal to or less than a first predetermined threshold value, or otherwise negatively if the calculated evaluation target value is more than the first predetermined threshold value.

This evaluation will be described in further detail with reference to the two-dimensional graph of FIG. 3. In this graph, the horizontal axis and the vertical axis respectively represent the acceleration G and jerk J received by the driving operation evaluator 20e. It is assumed that the acceleration G and the jerk J are both positive.

The values of the acceleration G and jerk J obtained when the evaluation target value is calculated are plotted on the graph as coordinates (G, J). If the coordinates are located on a first reference line L1, of which the gradient is the first threshold value, or in a region below the first reference line L1 (regions A and B), the driving operation evaluator 20e positively evaluates the driver's operation. On the other hand, if the coordinates are located in a region above the first reference line L1 (regions C1 to C3), the driving operation evaluator 20e negatively evaluates the driver's operation.

In the region A, both of the acceleration G and the jerk J are small, which indicates that the vehicle C is traveling at a substantially constant speed. Thus, the driver's operation is evaluated as "very good." In the region B, the acceleration G is larger than a predetermined acceleration G1, but does not vary so much as to shake the body of the passenger of the vehicle C (the jerk is small). Thus, in this range, the driver's operation is evaluated as "good."

On the other hand, in the regions C1 to C3, the acceleration G varies so much as to shake the body of the passenger of the vehicle C. Thus, in this range, the driver's operation is negatively evaluated.

In this exemplary embodiment, the negative evaluation is classified into "not good," "bad," and "very bad" depending on the magnitude of the evaluation target value. Specifically, if the evaluation target value is larger than the first predetermined threshold value and equal to or smaller than a second predetermined threshold value which is larger than the first predetermined threshold value, the driver's operation is evaluated as "not good." If the evaluation target value is larger than the second predetermined threshold value and is equal to or smaller than a third predetermined threshold value which is larger than the second predetermined threshold value, the driver's operation is evaluated as "bad." If the evaluation target value is larger than the third predetermined threshold value, the driver's operation is evaluated as "very bad." That is to say, referring to the graph, if the coordinates are located in the region C1 above the first reference line L1 and below a second reference line L2, the gradient of which is the second predetermined threshold value, the driver's operation is evaluated as "not good." If the coordinates are located in the region C2 above the second reference line L2 and below a third reference line L3, the gradient of which is the third predetermined threshold value, the driver's operation is evaluated as "bad." If the coordinates are located in the region C3 above the third reference line L3, the driver's operation is evaluated as "very bad." Note that the negative evaluation is not necessarily classified in this manner In such a case, the evaluation target value may be compared with the first predetermined threshold value.

In this exemplary embodiment, the driving operation evaluator 20e evaluates the driver's operation based on not only the evaluation target value (hereinafter referred to as a "longitudinal evaluation target value") derived from the acceleration of the vehicle C (the acceleration in the longitudinal direction of the vehicle), but also an evaluation target value (hereinafter referred to as a "transverse evaluation target value") derived from lateral acceleration of the vehicle C (acceleration in the transverse direction of the vehicle). Evaluation based on the longitudinal evaluation target value corresponds to evaluation of how well the driver operates the accelerator pedal or the brake pedal, and evaluation based on the transverse evaluation target value corresponds to evaluation of how well the driver operates the steering wheel.

The transverse evaluation target value is calculated in the same way as the longitudinal evaluation target value. Specifically, the transverse evaluation target value is |Ja/Ga| where Ga represents the lateral acceleration in the right or left direction of the vehicle C, and Ja represents the rate of change (jerk) of the lateral acceleration Ga. The lateral acceleration Ga is also obtained based on the speeds of the wheels 11 detected by the wheel speed sensors 22. Specifically, the acceleration/jerk calculator 20d calculates the lateral acceleration Ga based on the driving speed of the vehicle C obtained from the speeds of the wheels 11 and the steering angle detected by the steering angle sensor 23, by reference to a map on which the relationship among the driving speed of the vehicle C, the steering angle, and the lateral acceleration Ga is predefined. In addition, the acceleration/jerk calculator 20d calculates the jerk Ja by differentiation of the lateral acceleration Ga. Then, the driving operation evaluator 20e receives the lateral acceleration Ga and the jerk Ja from the acceleration/jerk calculator 20d to calculate |Ja/Ga|, thereby obtaining the transverse evaluation target value. Note that a lateral acceleration sensor which detects the lateral acceleration of the vehicle C may be provided such that the driving operation evaluator 20e receives the lateral acceleration Ga from the lateral acceleration sensor, instead of from the acceleration/jerk calculator 20d.

Just like the longitudinal evaluation target value, the transverse evaluation target value is also calculated when the sign of the value obtained by differentiation of the jerk Ja changes, i.e., at a timing when the jerk Ja reaches its peak. The evaluation based on the transverse evaluation target value is performed in the same manner as the evaluation based on the longitudinal evaluation target value (i.e., the transverse evaluation target value is compared to three threshold values respectively corresponding to the first to third predetermined threshold values).

Figure 4:
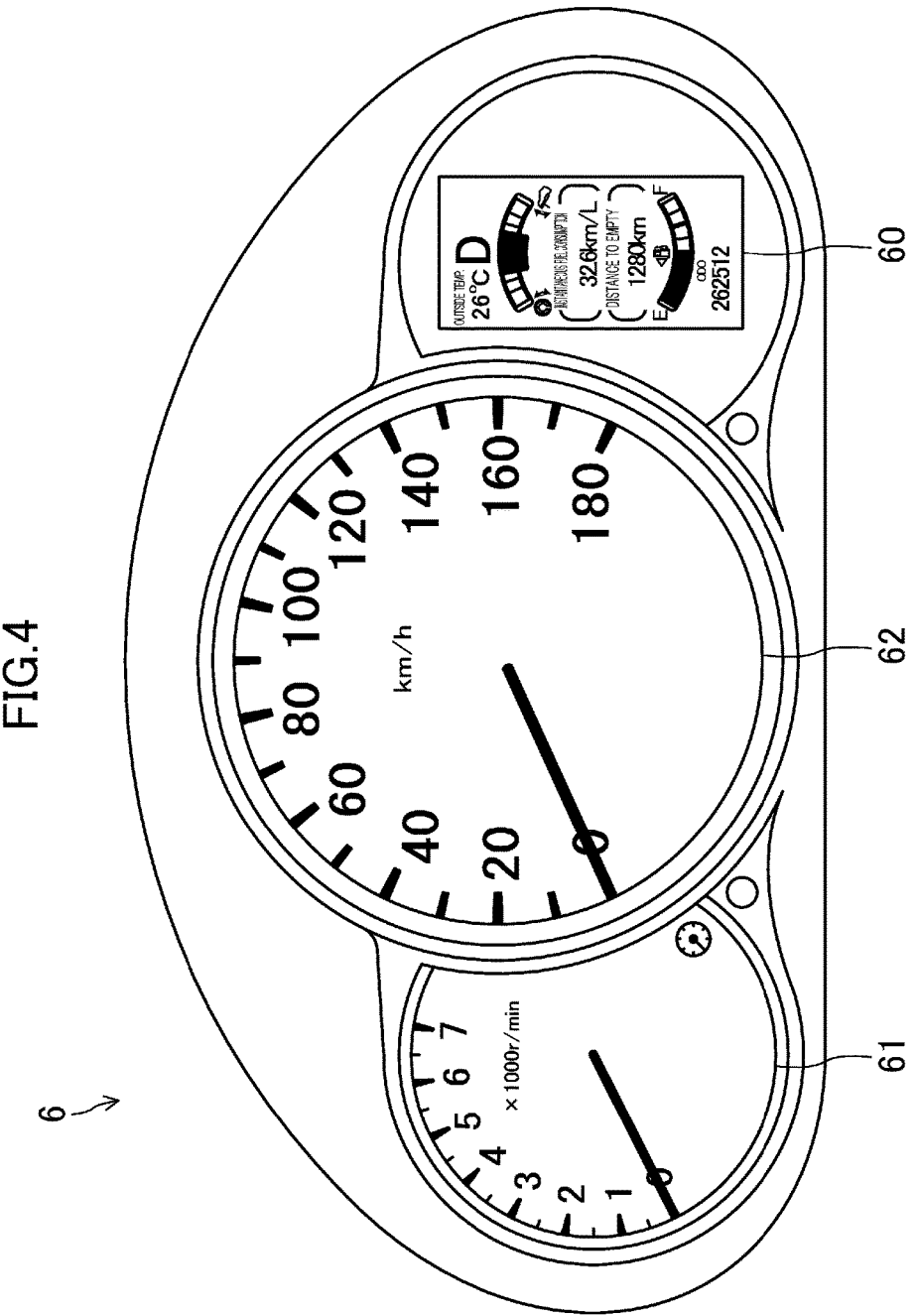
FIG. 4 shows an example of an indicator as viewed from the driver (from the rear of the vehicle).

As shown in FIG. 4, the indicator 6 includes a tachometer 61 which indicates the revolutions per minute (rpm) of the engine 1 detected by an rpm sensor (not shown), a speedometer 62 which indicates the driving speed of the vehicle C, and a display 60 which indicates the results of the evaluation based on the longitudinal evaluation target value and the evaluation based on the transverse evaluation target value. The display 60 is a color TFT liquid crystal display configured as a multi information display. Note that, in this exemplary embodiment, the display 60 shows additional pieces of information other than the two evaluation results, namely, the range position, the amount of remaining fuel, and the cumulative distance traveled (see FIG. 5).

Every time the driving operation evaluator 20e performs the evaluation based on the longitudinal evaluation target value and the evaluation based on the transverse evaluation target value, the display controller 20f receives the evaluation results from the driving operation evaluator 20e and shows them on the display 60.

Figure 5:
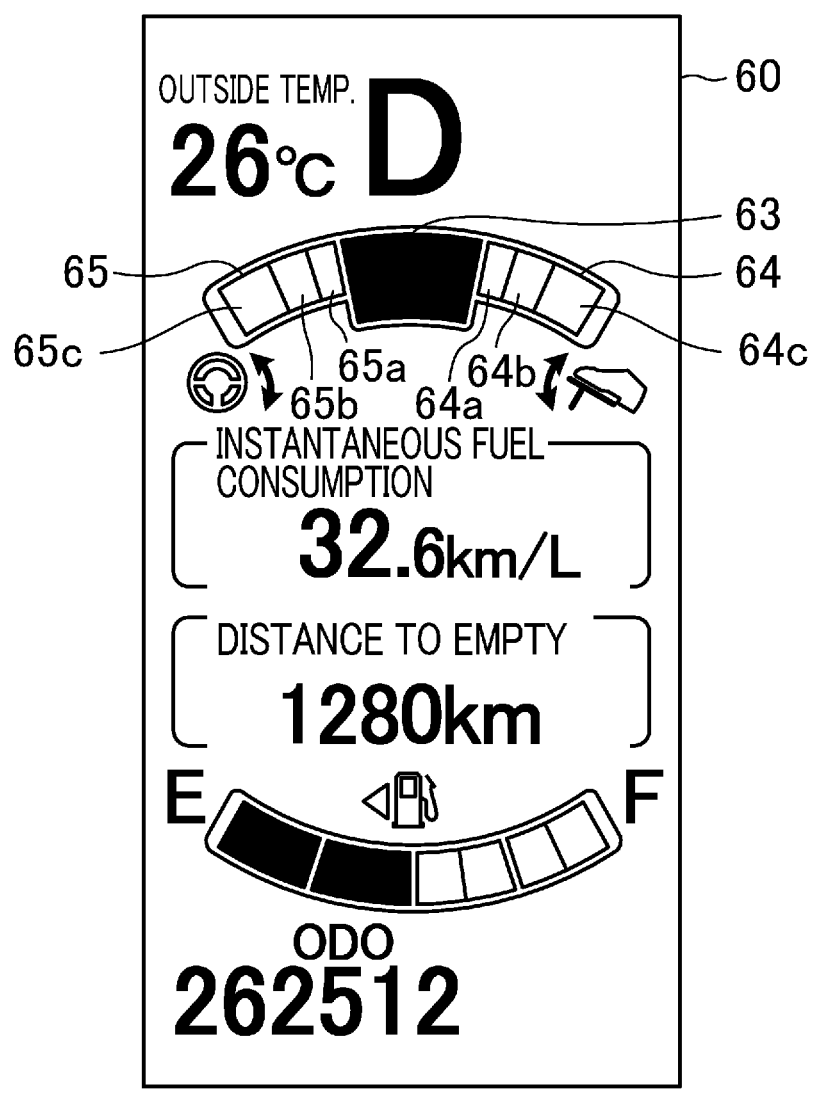
FIG. 5 shows a display of the indicator on which the results of evaluation of the driver's operation are shown.

As shown in FIG. 5, the display 60 includes a first display section 63 which indicates in colors the results of the evaluation based on the longitudinal evaluation target value and the evaluation based on the transverse evaluation target value, a second display section 64 which indicates the negative evaluation result based on the longitudinal evaluation target value, as "not good," "bad," or "very bad," and a third display section 65 which indicates the negative evaluation result based on the transverse evaluation target value, as "not good," "bad," or "very bad." The second and third display sections 64 and 65 are respectively arranged on the right and left of the first display section 63 located at the center. An icon of a pedal is displayed below the bottom right of the second display section 64, and an icon of a steering wheel is displayed below the bottom left of the third display section 65. These icons inform the driver that the second display section 64 is associated with the evaluation of how well the driver operates the accelerator pedal or the brake pedal (the evaluation based on the longitudinal evaluation target value), and that the third display section 65 is associated with the evaluation of how well the driver operates the steering wheel (the evaluation based on the transverse evaluation target value).

The second display section 64 is comprised of three segments 64a, 64b, and 64c arranged side by side in the horizontal direction. If the result of the evaluation based on the longitudinal evaluation target value is "not good," only the leftmost segment 64a (closest to the first display section 63) is lit in white. If the evaluation result is "bad," the leftmost segment 64a and the central segment 64b are lit in white. If the evaluation result is "very bad," all the three segments 64a, 64b, 64c are lit in white. In other words, the worse the evaluation result is, the longer the second display section 64 extends rightward like a bar.

Just like the second display section 64, the third display section 65 is also comprised of three segments 65a, 65b, and 65c arranged side by side in the horizontal direction. The worse the evaluation result is, the longer the third display section 65 extends leftward like a bar.

If the result of the evaluation based on the longitudinal evaluation target value or the transverse evaluation target value is "very good," the display controller 20f lights the first display section 63 in green. If the result of the evaluation based on the longitudinal evaluation target value or the transverse evaluation target value is "good," the display controller 20f lights the first display section 63 in blue. When the first display section 63 is lit in green or blue, the driver cannot tell which of the evaluation result based on the longitudinal evaluation target value or the evaluation result based on the transverse evaluation target value is "very good" or "good" (positive). However, as long as the evaluation is positive, there is no serious problem even if it is not indicated which of the two evaluation results is superior to the other, because the driver does not care very much about that. Optionally, which of the two evaluation results is superior to the other may be indicated on the display.

On the other hand, if the result of the evaluation based on the longitudinal evaluation target value or the result of the evaluation based on the transverse evaluation target value is negative, the display controller 20f lights the first display section 63 in white. If the result of the evaluation based on the longitudinal evaluation target value is negative, the display controller 20f extends the bar of the second display section 64 to a varying length according to the grade of the negative evaluation. If the result of the evaluation based on the transverse evaluation target value is negative, the display controller 20f extends the bar of the third display section 65 to a varying length according to the grade of the negative evaluation. Thus, the driver can see how bad each of the evaluation results is.

Figure 6:
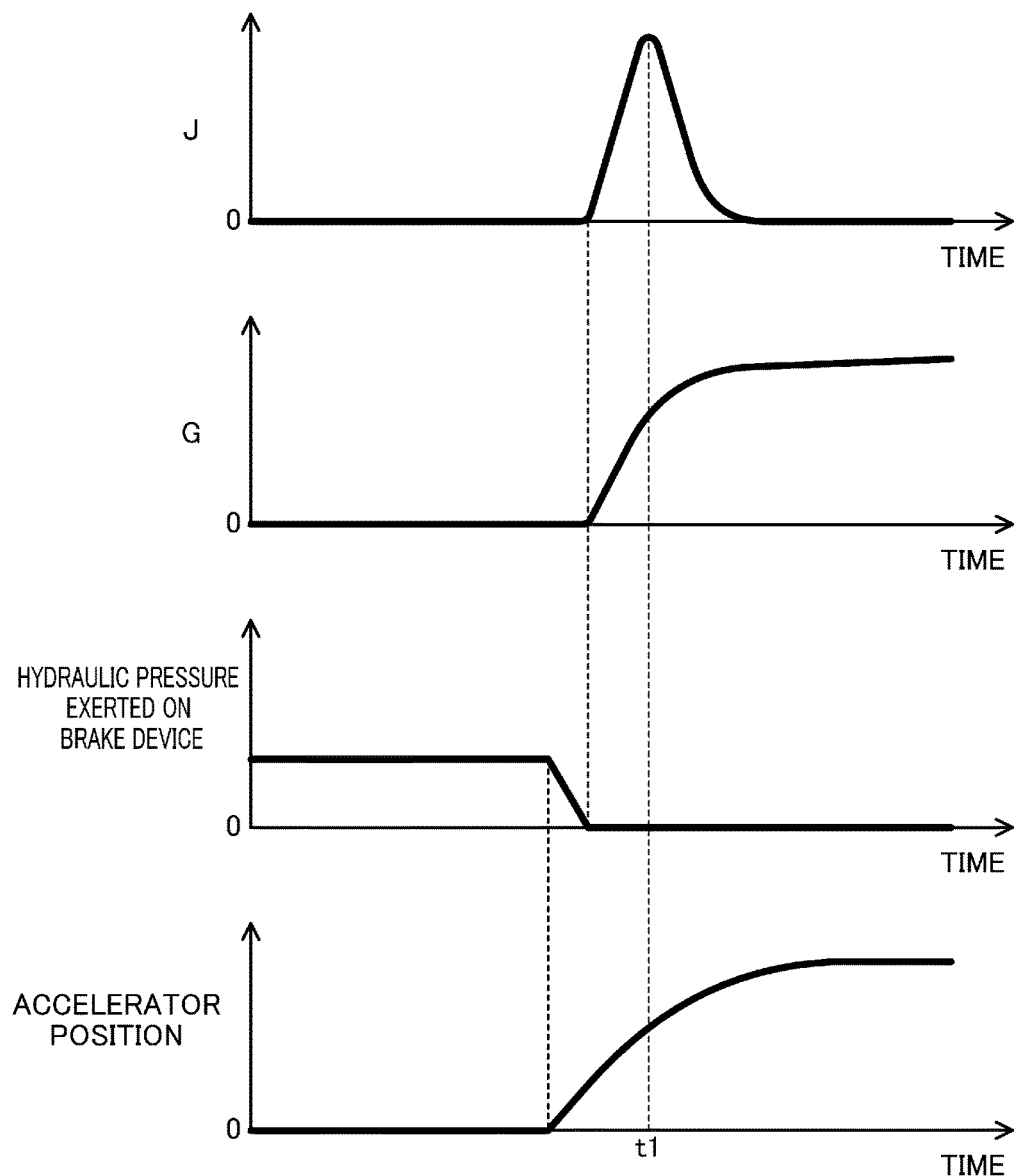
FIG. 6 is a timing chart showing changes in the acceleration of the vehicle, the rate of change of the acceleration (jerk), a hydraulic pressure exerted on a brake device, and an accelerator position when an accelerator pedal is depressed to start the vehicle while a brake hold control is being executed.

Suppose that the vehicle C is stationary while the range position detected by the range position sensor 26 is at the drive range position (D range position in particular). In this case, if the driver of the vehicle C stops depressing the brake pedal when the selector switch 27 is ON, the brake device controller 20c executes the brake hold control. If the driver depresses the accelerator pedal while the brake hold control is being executed by the brake device controller 20c, the brake device controller 20c releases the brake devices 15 from the braking state, and the vehicle C starts to move at the point of time when the release of the brake devices 15 from the braking state is substantially completed. Specifically, as shown in FIG. 6, the hydraulic pressure exerted on the brake devices 15 starts to decrease when the driver started to depress the accelerator pedal. Then, when the hydraulic pressure goes almost zero, the acceleration of the vehicle C is generated.

Figure 7:
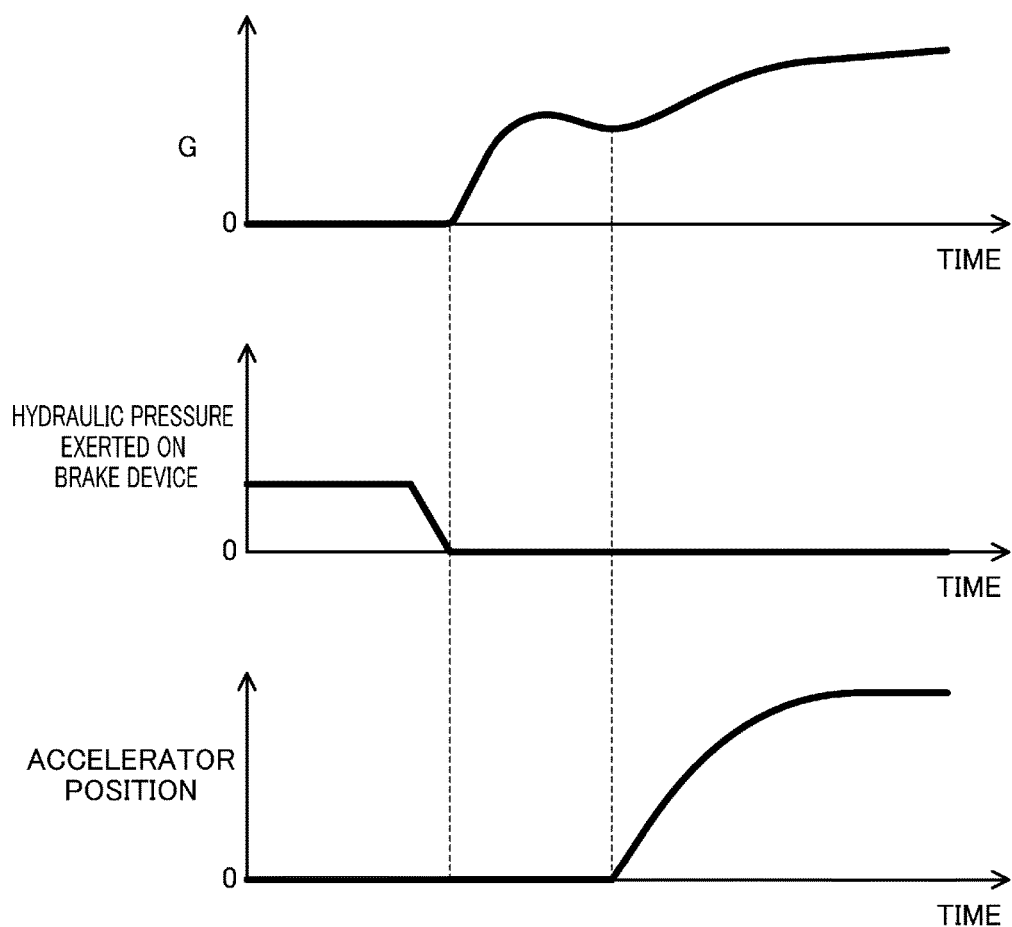
FIG. 7 is a timing chart showing changes in the acceleration of the vehicle, the hydraulic pressure exerted on the brake device, and the accelerator position when the accelerator pedal is depressed to start the vehicle while the brake hold control is not executed.

On the other hand, if the driver stops depressing the brake pedal to start the vehicle C while the selector switch 27 is OFF, as shown in FIG. 7, the hydraulic pressure exerted on the brake devices 15 starts to decrease when the driver started to stop depressing the brake pedal. Then, when the hydraulic pressure goes almost zero, the vehicle C starts to move due to the creep torque of the automatic transmission 2. At this point of time, the acceleration of the vehicle C is generated. Thereafter, as the driver depresses the accelerator pedal, the acceleration of the vehicle C further increases. As can be seen, if the driver depresses the accelerator pedal to start the vehicle C while the brake hold control is not executed, the acceleration rises in two phases, i.e., it rises due to the creep torque, and subsequently rises responsive to the depression of the accelerator pedal by the driver. The same is applied to a vehicle without a brake hold system.

In contrast, if the accelerator pedal is depressed to start the vehicle C while the brake hold control is being executed, the acceleration rises only in a single phase, i.e., responsive to the depression of the accelerator pedal by the driver. As a result, when the driver depresses the accelerator pedal to start the vehicle C while the brake hold control is being executed, the acceleration of the vehicle C tends to rise steeply.

Thus, when the driver depresses the accelerator pedal to start the vehicle C while the brake hold control is being executed, the result of the evaluation based on the longitudinal evaluation target value tends to be negative even if he or she did not abruptly depress the accelerator pedal. This is because the longitudinal evaluation target value at the first peak of the jerk J (at time t1 in FIG. 6) tends to be larger than the first predetermined threshold value. If the result of the evaluation based on the longitudinal evaluation target value is negative, the first display section 63 of the display 60 is lit in white, and the bar of the second display section 64 extends to a varying length according to the grade of the negative evaluation. The driver who has seen the negative evaluation result on the display 60 may be dissatisfied with the result because he or she did not intend to abruptly depress the accelerator pedal.

In view of this drawback, the control unit 20 according to this exemplary embodiment is provided with a threshold modifier 20g. If the driver depresses the accelerator pedal in a situation where the brake hold control is being executed by the brake device controller 20c while the vehicle C is stationary, the threshold modifier 20g increases the first predetermined threshold value (steepens the gradient of the first reference line L1 in FIG. 3), which is used for the evaluation based on the longitudinal evaluation target value, for a predetermined period since the driver started to depress the accelerator pedal. This will be referred to herein as a "threshold modification process."

As a result of the threshold modification process by the threshold modifier 20g, the first predetermined threshold value is changed from a basic value to a modified value larger than the basic value for the predetermined period, and is reset to the basic value when the predetermined period ends. The modified value is set such that, if the driver did not depress the accelerator pedal abruptly to start the vehicle C while the brake hold control is being executed, the driver's operation is positively evaluated based on the longitudinal evaluation target value calculated at the first peak of the jerk J since the driver started to depress the accelerator pedal (peak reached at time t1 in FIG. 6).

Figure 3:
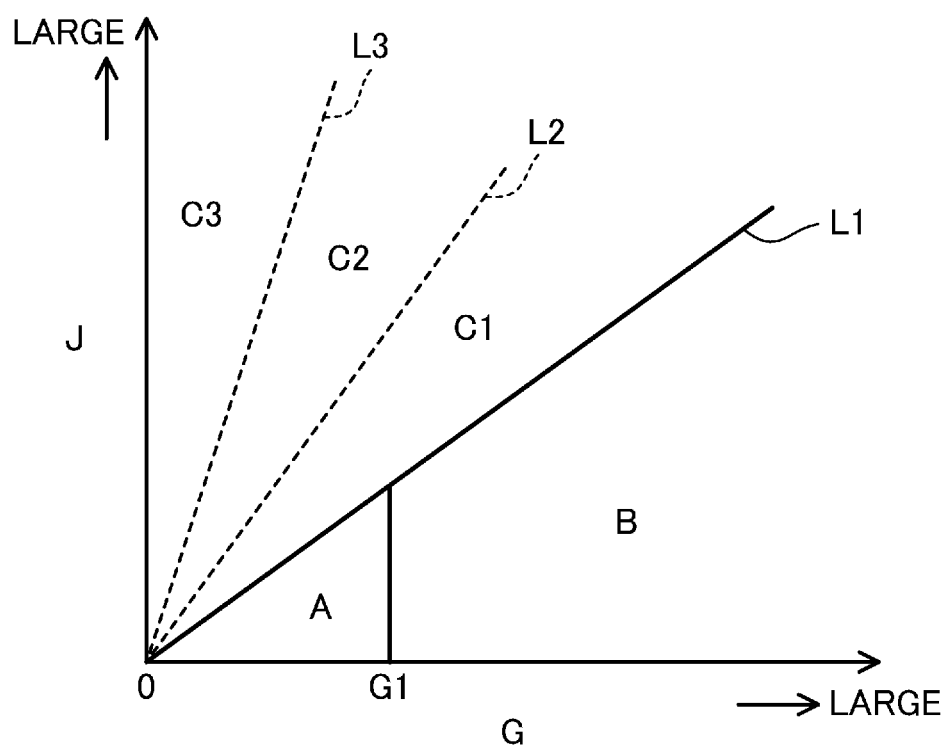
FIG. 3 is a graph showing a relationship between acceleration and jerk of the vehicle and evaluation of operation of a driver of the vehicle.

In this exemplary embodiment, during the threshold modification process, as the first predetermined threshold value is increased, the second and third predetermined threshold values are also increased (i.e., the gradients of the second and third reference lines L2 and L3 shown in FIG. 3 are steepened). In this case, the second and third predetermined threshold values are increased by the same amount as the amount of increase in the first predetermined threshold value (the modified value–the basic value). Note that the three threshold values used for making the evaluation based on the transverse evaluation target value are not modified.

In this exemplary embodiment, the predetermined period may be a period from when the driver started to depress the accelerator pedal to when a predetermined time passes. The predetermined time is slightly longer than a period from when the driver started to depress the accelerator pedal to when the jerk J reaches its first peak (at time t1 in FIG. 6), and is set to be, for example, 2 s-4 s. In place of the predetermined time, the predetermined period may also be, for example, a period from when the driver started to depress the accelerator pedal to when the jerk J reaches its first peak.

The predetermined period starts when the driver started to depress the accelerator pedal. The start of the depression of the accelerator pedal may be directly detected by the accelerator position sensor 21. Alternatively, a sensor or any other device may be configured to detect the hydraulic pressure exerted on the brake devices 15 so that when to start the predetermined period may be indirectly detected (determined) when the brake device controller 20c executing the brake hold control instructs the brake devices 15 to stop braking. Alternatively, the start of the depression of the accelerator pedal may be indirectly detected (determined) by the reception of a signal from the brake device controller 20c executing the brake hold control to instruct the brake devices 15 to stop braking.

In this exemplary embodiment, the threshold modifier 20g executes the threshold modification process if a predetermined threshold modification condition is met, i.e., when the driver depresses the accelerator pedal in a situation where the brake hold control is being executed by the brake device controller 20c while the vehicle C is stationary.

The predetermined threshold modification condition includes at least one of the following conditions: the engine 1 is automatically stopped; the automatic transmission 2 is running in a power transmission state (in particular the range position sensor 26 detects that the shift lever is at the forward drive range position); the gradient sensor 25 detects that an uphill gradient of a road on which the vehicle C is stationary is less than a predetermined value (i.e., the gradient sensor 25 detects a positive gradient value of less than the predetermined value); or the gradient sensor 25 detects that a downhill gradient of a road on which the vehicle C is stationary is equal to or more than a preset value (i.e., the gradient sensor 25 detects a negative gradient value, the absolute value of which is equal to or more than the preset value). Specifically, if the driver depresses the accelerator pedal in a situation where the brake hold control is being executed while the vehicle is stationary (i.e., when the predetermined threshold modification condition is met), the vehicle C tends to start abruptly. Thus, the driver's operation at the start of the vehicle C may tend to be evaluated negatively based on the longitudinal evaluation target value. To avoid this, the threshold modification process is performed.

Optionally, the threshold modification process may also be performed as long as the accelerator pedal is depressed in a situation where the brake hold control is being executed by the brake device controller 20c while the vehicle is stationary, irrespective of whether the predetermined threshold modification condition is met or not.

Figure 8:
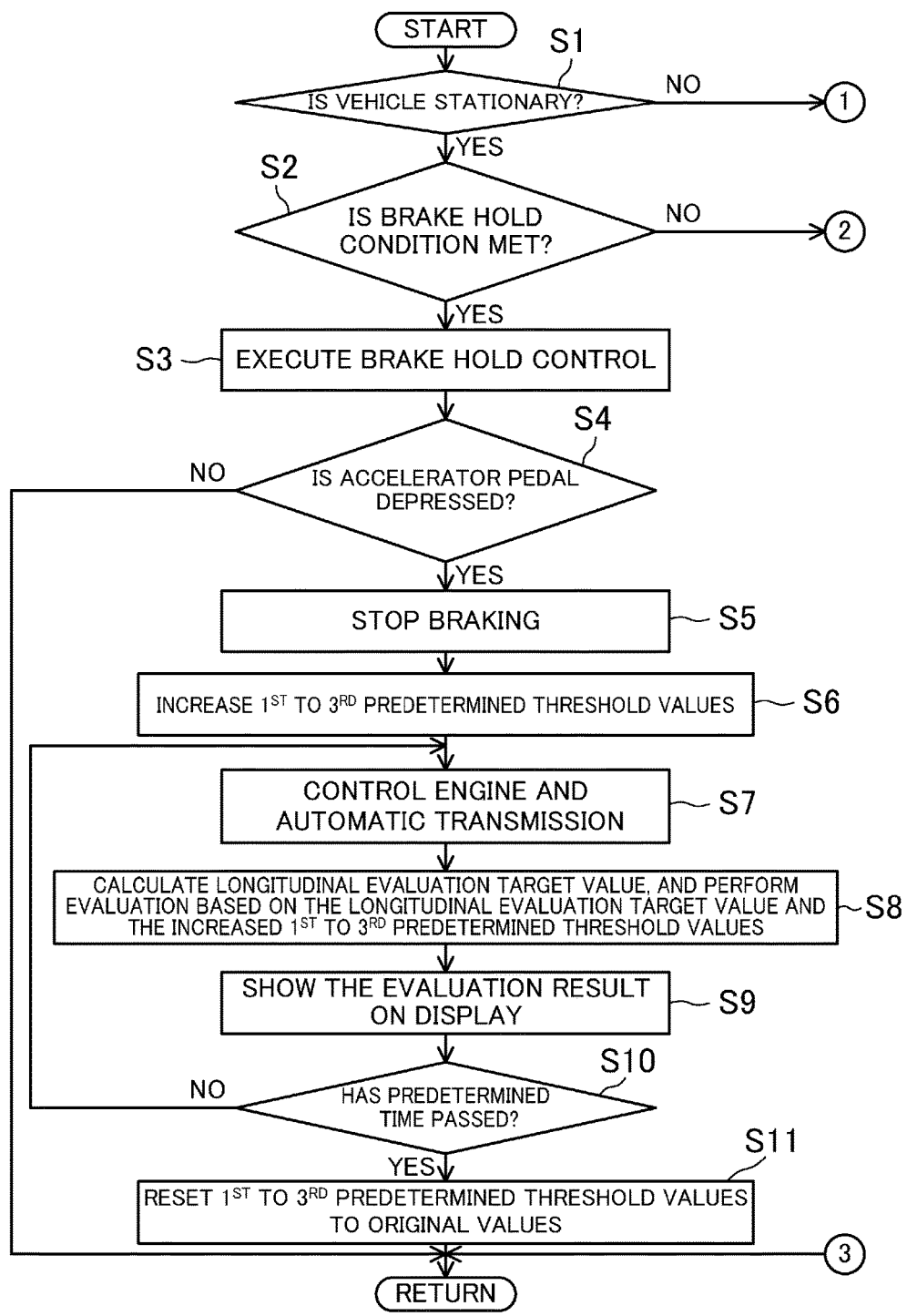
FIG. 8 is a flowchart showing a part of processing steps performed by a control unit for starting the vehicle that is stationary.
Figure 9:
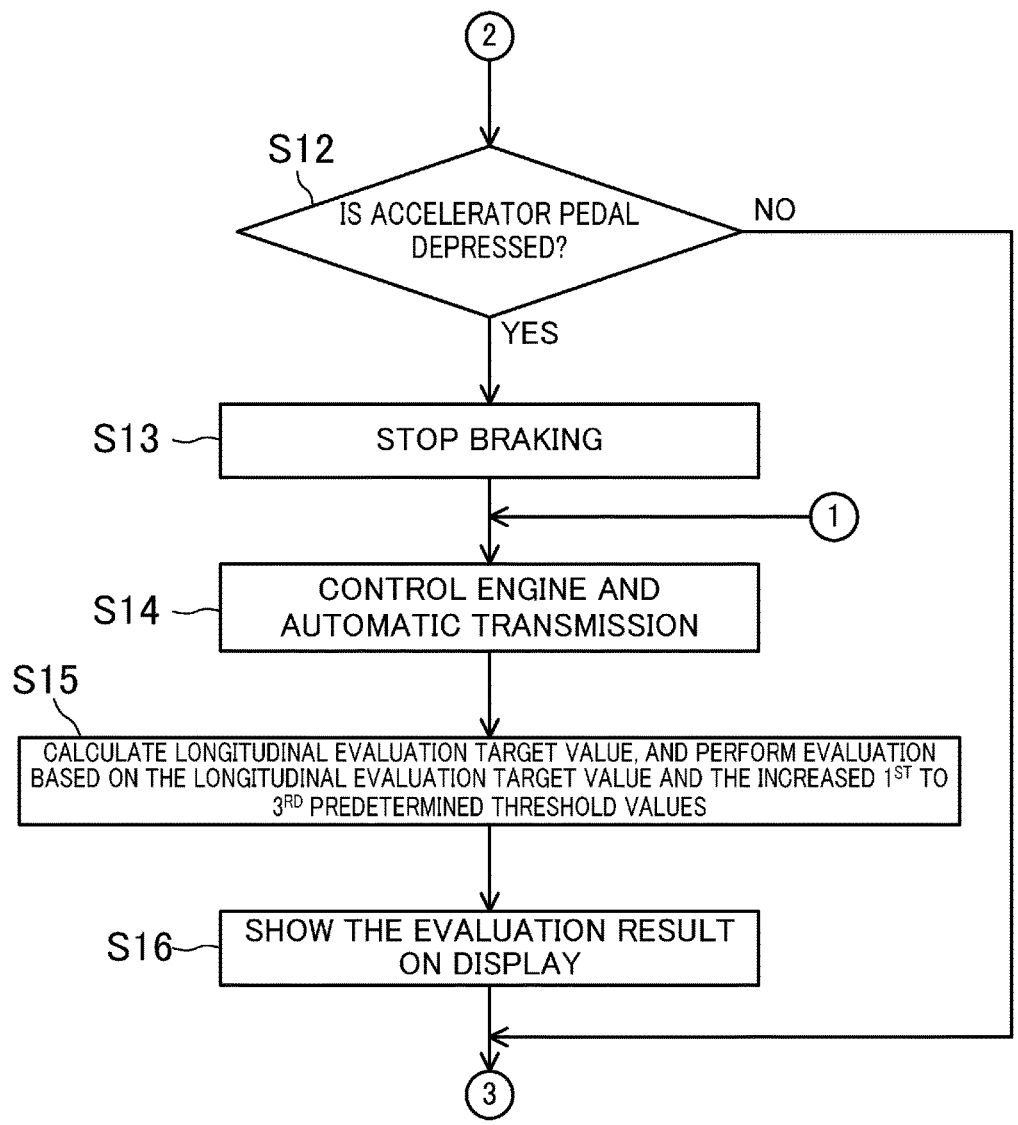
FIG. 9 is a flowchart showing the rest of the processing steps performed by the control unit for starting the vehicle that is stationary.

Processing steps performed by the control unit 20 for starting the vehicle C in a stationary state will be described with reference to the flowcharts shown in FIGS. 8 and 9. Only the evaluation based on the longitudinal evaluation target value will be described below. The calculation of the acceleration G and the jerk J, which is performed at all times by the acceleration/jerk calculator 20d, will not be described below. Further, it is assumed that the predetermined threshold modification condition is met while the vehicle C is stationary. It is also assumed that the shift range position detected by the range position sensor 26 is the forward drive range position.

In the first step S1, the brake device controller 20c determines whether the vehicle C is stationary or not. If the answer in step S1 is NO, the flow proceeds to step S14. Alternatively, if the answer is YES, the flow proceeds to step S2, in which the brake device controller 20c determines whether a predetermined brake hold condition is met or not.

If the answer in step S2 is NO, the flow proceeds to step S12. If the answer in step S2 is YES, the flow proceeds to step S3, in which the brake device controller 20c executes the brake hold control.

In the next step S4, the brake device controller 20c determines whether the accelerator pedal has been depressed or not. If the answer in step S4 is NO, the flow proceeds to RETURN. Alternatively, if the answer in step S4 is YES, the flow proceeds to step S5, in which the brake device controller 20c instructs the brake devices 15 to stop braking.

In the next step S6, the threshold modifier 20g performs the threshold modification process to modify the first to third predetermined threshold values to larger values (the first predetermined threshold value is modified from the basic value to the modified value).

In the next step S7, the engine controller 20a controls the engine 1 (i.e., its components such as the throttle valve 31, the fuel injection valve 32, the ignition plug 33) based on the accelerator position. Simultaneously, the transmission controller 20b determines the gear position based on the accelerator position and the driving speed of the vehicle C, and instructs the plurality of frictional coupling elements 41 of the automatic transmission 2 to couple or uncouple to shift the gear to the gear position.

In the next step S8, the driving operation evaluator 20e calculates the longitudinal evaluation target value when the jerk J reaches its peak, and evaluates the driver's operation based on the calculated longitudinal evaluation target value and the modified first to third predetermined threshold values. In the next step S9, the display controller 20f shows the evaluation result on the display 60 (the first display section 63 or both of the first and second display sections 63 and 64).

In the next step S10, the threshold modifier 20g determines whether a predetermined time has passed since the driver started to depress the accelerator pedal. If the answer in step S10 is NO, the flow goes back to step S7. Alternatively, if the answer in step S10 is YES, the flow proceeds to step S11, in which the threshold modifier 20g resets the first to third predetermined threshold values to original values, and then goes to RETURN.

In step S12 to be performed when the answer in step S2 is NO, the brake device controller 20c determines whether the accelerator pedal has been depressed or not. If the answer in step S12 is NO, the flow directly goes to RETURN. Alternatively, if the answer in step S12 is YES, the flow proceeds to step S13, in which the brake device controller 20c instructs the brake devices 15 to stop braking, and then proceeds to step S14.

In step S14, the engine controller 20a controls the engine 1 based on the accelerator position. Simultaneously, the transmission controller 20b determines the gear position based on the accelerator position and the driving speed of the vehicle C, and instructs the plurality of frictional coupling elements 41 of the automatic transmission 2 to couple or uncouple to shift the gear to the gear position thus determined.

In the next step S15, the driving operation evaluator 20e calculates the longitudinal evaluation target value when the jerk J reaches its peak, and evaluates the driver's operation based on the calculated longitudinal evaluation target value and the first to third predetermined threshold values (values before the modification). In the next step S16, the display controller 20f shows the evaluation result on the display 60 (the first display section 63 or both of the first and second display sections 63 and 64), and then the flow goes to RETURN.

Thus, in this exemplary embodiment, if the accelerator pedal is depressed in a situation where the brake hold control is being executed by the brake device controller 20c while the vehicle C is stationary, the threshold modifier 20g executes the threshold modification process of increasing the first to third predetermined threshold values for the predetermined period since the driver started depressing the accelerator pedal (until the predetermined time passes). Thus, even if the acceleration rose steeply although the driver did not abruptly depress the accelerator pedal in starting the vehicle C while the brake hold control is being executed, the longitudinal evaluation target value would not easily exceed the first predetermined threshold value during the predetermined period. This substantially prevents the driving operation evaluator 20e from evaluating the driver's operation negatively (based on the longitudinal evaluation target value), and reduce the possibility that the display controller 20f lights the first display section 63 in white and shows the bar of the second display section 64. Consequently, when the driver depresses the accelerator pedal to start the vehicle C while the brake hold control is being executed, the driver is much less likely dissatisfied with the result of the evaluation of his or her operation (based on the longitudinal evaluation target value).

The present disclosure is not limited to the above-described exemplary embodiments, but any replacement may be made within the scope of the appended claims.

For example, in the above-described exemplary embodiments, |J/G| has been employed as the longitudinal evaluation target value. However, the longitudinal evaluation target value may also be the absolute value of the acceleration G or jerk J of the vehicle C. In such a case, the driving operation evaluator 20e obtains the longitudinal evaluation target value based on the acceleration G or jerk J received from the acceleration/jerk calculator 20d (the acceleration G may be received from the acceleration sensor). Then, the driving operation evaluator 20e evaluates the driver's operation positively (based on the longitudinal evaluation target value) if the longitudinal evaluation target value is equal to or less than a predetermined threshold value, or otherwise negatively if the longitudinal evaluation target value is more than the predetermined threshold value. Likewise, the transverse evaluation target value may also be the absolute value of the lateral acceleration Ga or jerk Ja.

The embodiments described above are mere examples, and are not to be construed as limiting the scope of the present disclosure. The scope of the present disclosure is defined by the appended claims. Variations and modifications of equivalents of the claims are all intended to fall within the scope of the present disclosure.

Alternative embodiments of the present disclosure will be described below.

First Alternative Embodiment

Figure 2:
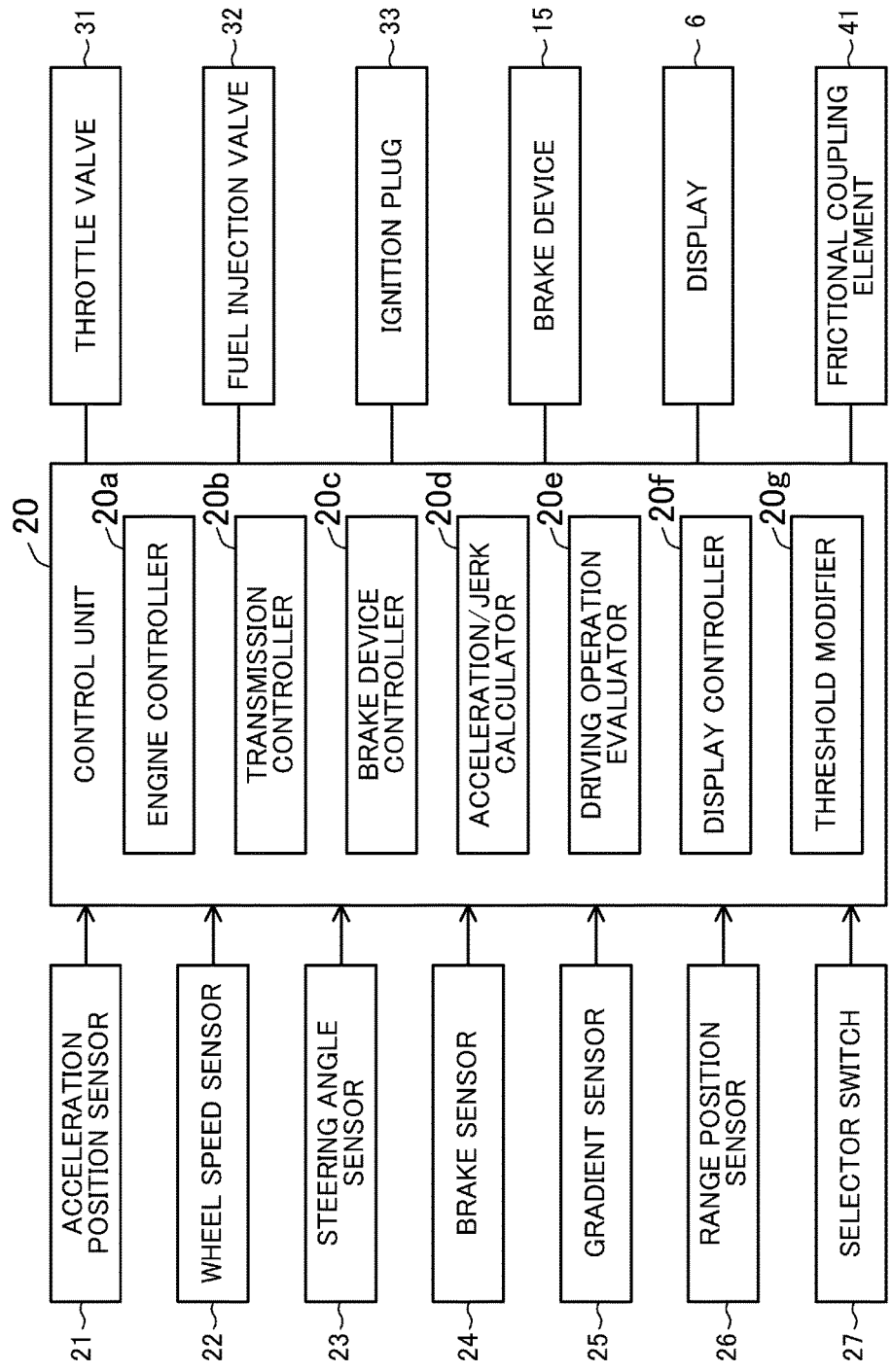
FIG. 2 is a block diagram showing a configuration of a control system of the control device.
Figure 10:
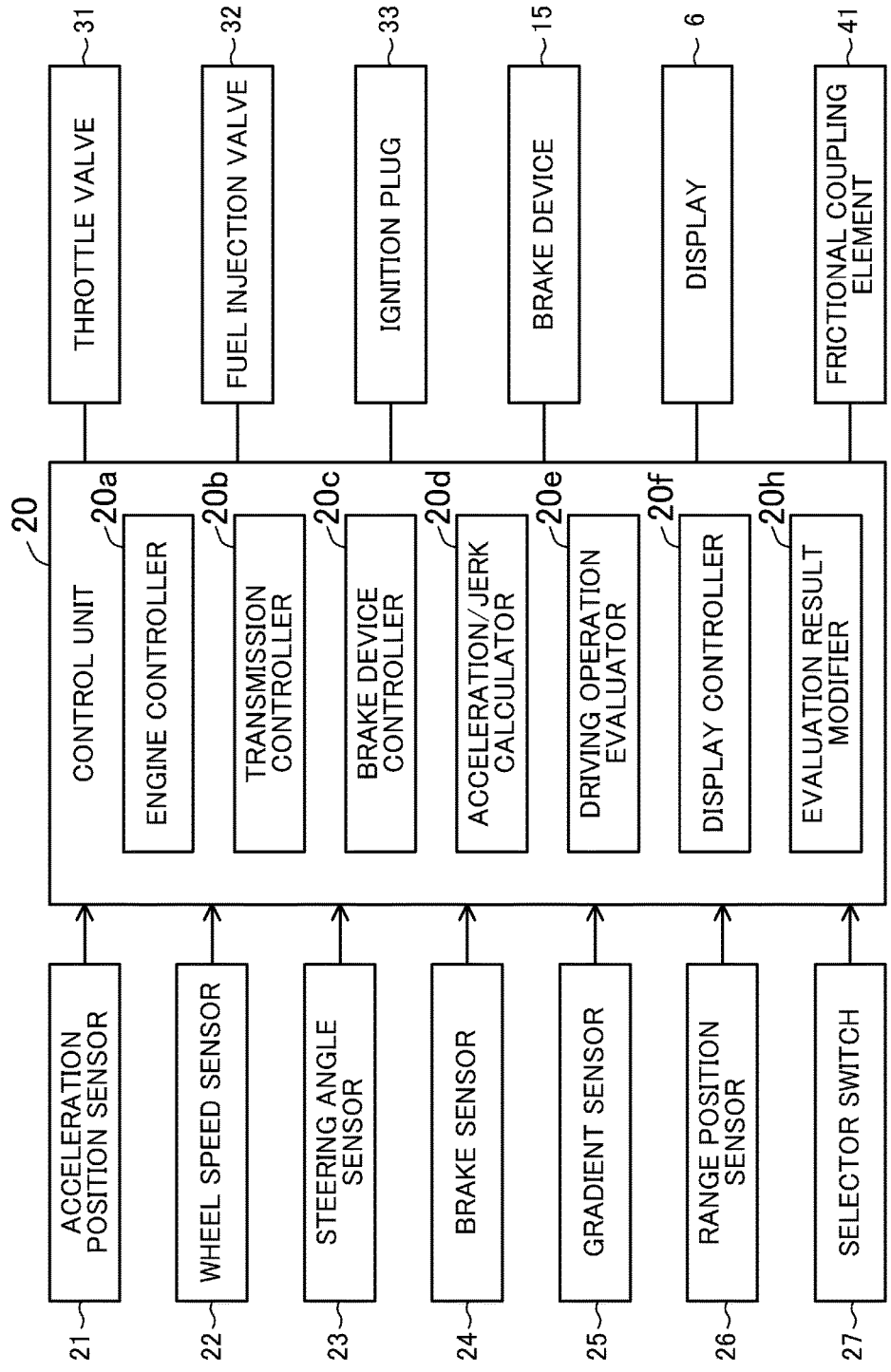
FIG. 10 is a view corresponding to FIG. 2, illustrating a first alternative embodiment.

FIG. 10 shows a first alternative embodiment, in which the threshold modifier 20g of the above-described exemplary embodiment is replaced with an evaluation result modifier 20h provided in the control unit 20. The evaluation result modifier 20h modifies the result of the evaluation of the driver's operation by the driving operation evaluator 20e (based on the longitudinal evaluation target value). The first alternative embodiment is the same as the above-described exemplary embodiment except for the replacement of the threshold modifier with the evaluation result modifier (like reference characters designate identical or corresponding components in FIGS. 2 and 10).

Even if the driving operation evaluator 20e negatively evaluates the driver's operation for the predetermined period since the driver started to depress the accelerator pedal in a situation where the brake hold control is being executed by the brake device controller 20c while the vehicle C is stationary, the evaluation result modifier 20h executes an evaluation modification process of modifying the negative evaluation result into a positive one. Then, the display controller 20f shows the modified evaluation result on the display 60.

The evaluation result modifier 20h may execute the evaluation modification process when the accelerator pedal is depressed in a situation where the brake hold control is being executed by the brake device controller 20c while the vehicle C is stationary, i.e., when a predetermined evaluation modification condition similar to the predetermined threshold modification condition is met. Alternatively, the evaluation result modifier 20h may execute the evaluation modification process irrespective of whether the predetermined evaluation modification condition is met or not.

Thus, the first alternative embodiment may also reduce, just like the exemplary embodiment described above, the possibility that the driver who depressed the accelerator pedal to start the vehicle C while the brake hold control is being executed is dissatisfied with the result of the evaluation of the driver's operation.

Second Alternative Embodiment

Figure 11:
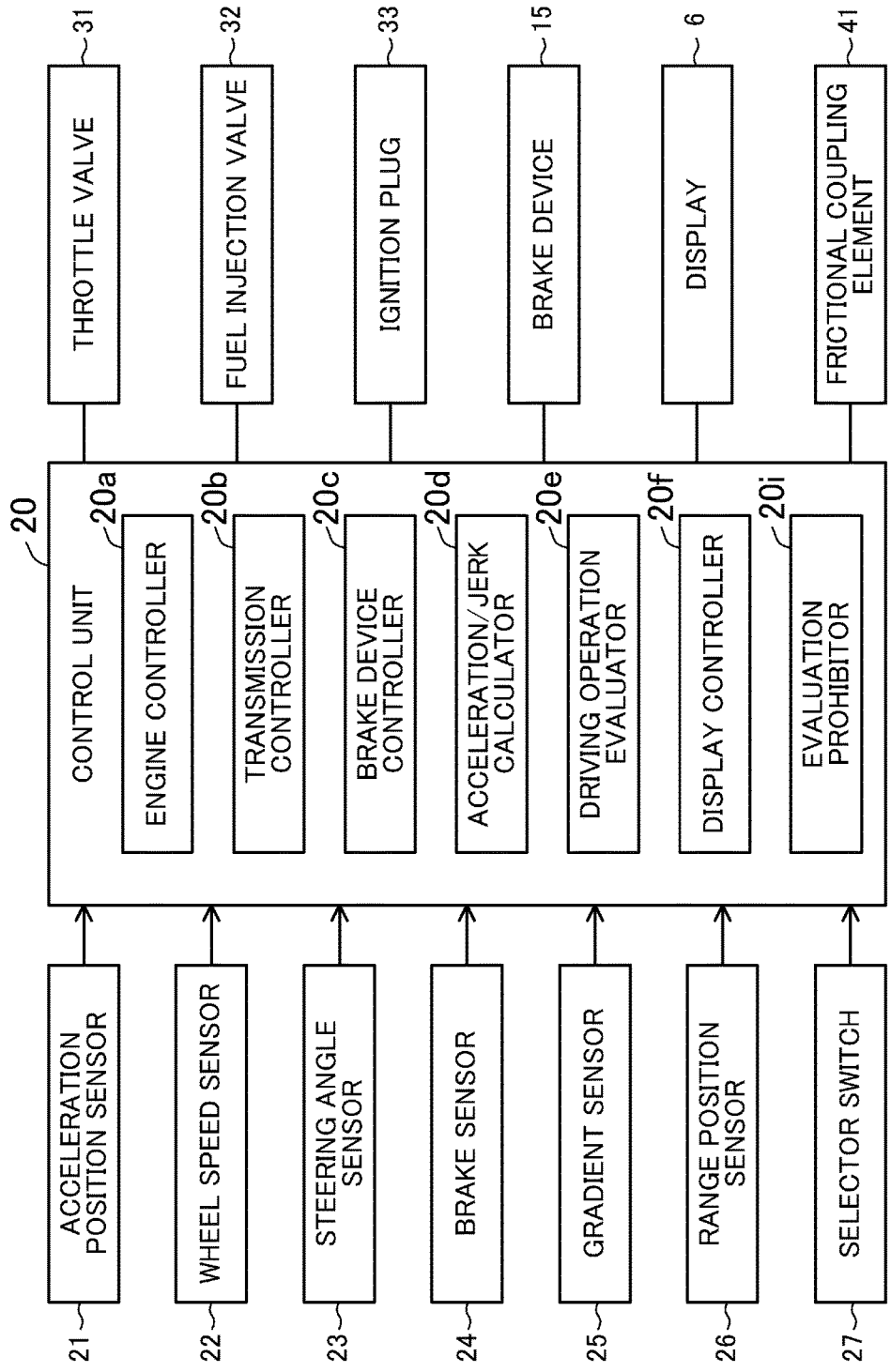
FIG. 11 is a view corresponding to FIG. 2, illustrating a second alternative embodiment.

FIG. 11 shows a second alternative embodiment, in which the threshold modifier 20g of the above-described exemplary embodiment is replaced with an evaluation prohibitor 20i provided in the control unit 20. The evaluation prohibitor 20h prohibits the driving operation evaluator 20e from evaluating the driver's operation. The second alternative embodiment is the same as the above-described exemplary embodiment except for the replacement of the threshold modifier with the evaluation prohibitor (like reference characters designate identical or corresponding components in FIGS. 2 and 11).

If the driver depresses the accelerator pedal in a situation where the brake hold control is being executed by the brake device controller 20c while the vehicle C is stationary, the evaluation prohibitor 20i executes an evaluation prohibition process of prohibiting the driving operation evaluator 20e from evaluating the driver's operation for the predetermined period since the driver started to depress the accelerator pedal.

The evaluation prohibitor 20i may execute the evaluation prohibition process when the accelerator pedal is depressed in a situation where the brake hold control is being executed by the brake device controller 20c while the vehicle C is stationary, i.e., when a predetermined evaluation prohibition condition similar to the predetermined threshold modification condition is met. Alternatively, the evaluation prohibitor 20i may execute the evaluation prohibition process irrespective of whether the predetermined prohibition modification condition is met or not.

Since the evaluation prohibitor 20i executes the evaluation prohibition process, the driving operation evaluator 20e no longer evaluates the driver's operation. Thus, the display controller 20f does not receive the evaluation result from the driving operation evaluator 20e, and the evaluation result of the driver's operation is not shown on the display 60.

Thus, the second alternative embodiment may also reduce, just like the exemplary embodiment described above, the possibility that the driver who depressed the accelerator pedal to start the vehicle C while the brake hold control is being executed is dissatisfied with the result of the evaluation of the driver's operation.

Third Alternative Embodiment

Figure 12:
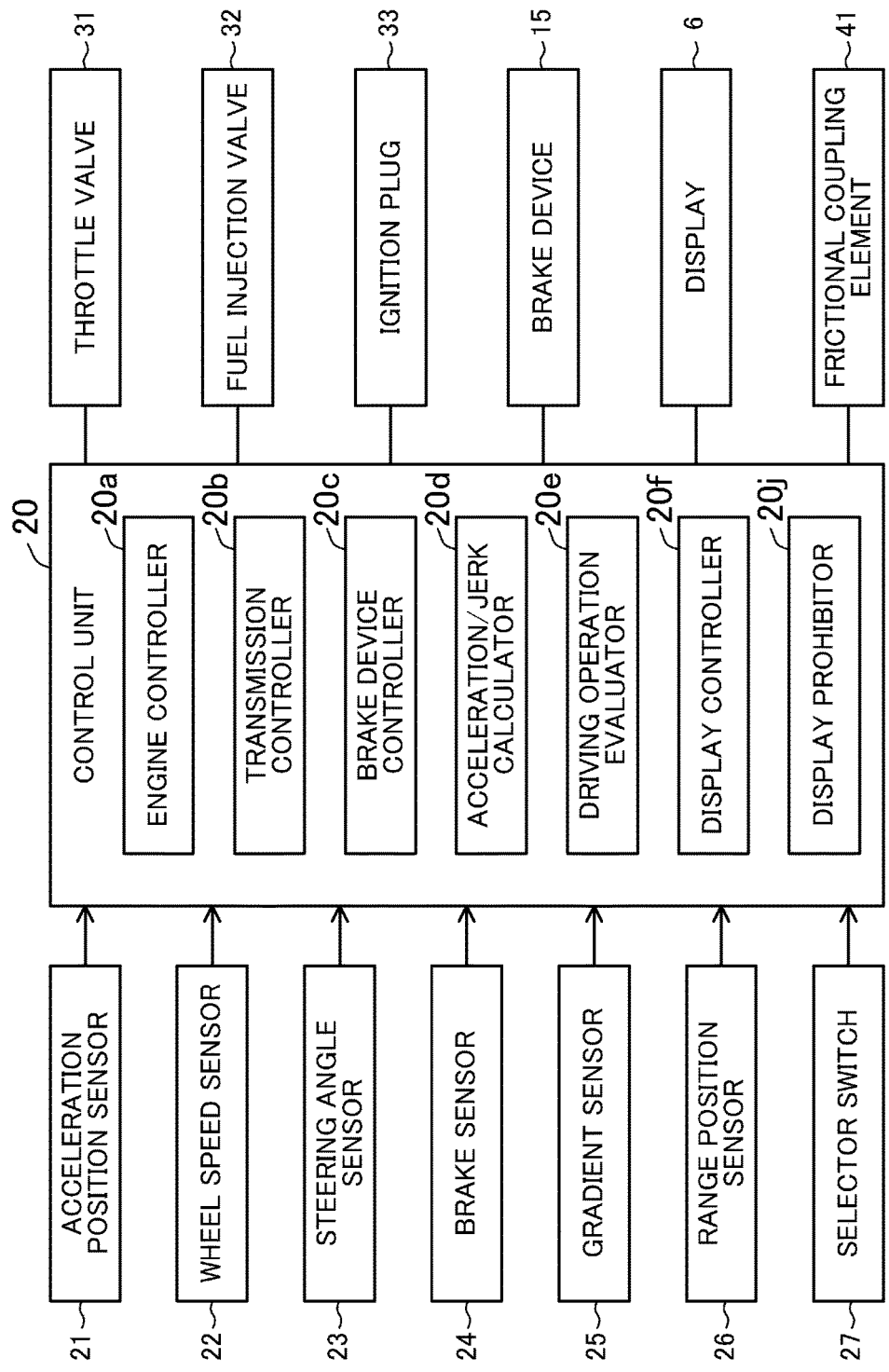
FIG. 12 is a view corresponding to FIG. 2, illustrating a third alternative embodiment.

FIG. 12 shows a third alternative embodiment, in which the threshold modifier 20g of the above-described exemplary embodiment is replaced with a display prohibitor 20j provided in the control unit 20. The display prohibitor 20j prohibits the display controller 20f from showing, on the display 60, the result of the evaluation of the driver's operation by the driving operation evaluator 20e. The third alternative embodiment is the same as the above-described exemplary embodiment except for the replacement of the threshold modifier with the display prohibitor (like reference characters designate identical or corresponding components in FIGS. 2 and 12).

When the driver depresses the accelerator pedal in a situation where the brake hold control is being executed by the brake device controller 20c while the vehicle C is stationary, the display prohibitor 20j executes a display prohibition process of prohibiting the display controller 20f from showing, on the display 60, the result of the evaluation of the driver's operation by the driving operation evaluator 20e for the predetermined period since the driver started to depress the accelerator pedal.

The display prohibitor 20j may execute the display prohibition process when the accelerator pedal is depressed in a situation where the brake hold control is being executed by the brake device controller 20c while the vehicle C is stationary, i.e., when a predetermined display prohibition condition similar to the predetermined threshold modification condition is met. Alternatively, the display prohibitor 20j may execute the display prohibition process irrespective of whether the predetermined display prohibition condition is met or not.

Thus, the third alternative embodiment may also reduce, just like the exemplary embodiment described above, the possibility that the driver who depressed the accelerator pedal to start the vehicle C while the brake hold control is being executed is dissatisfied with the result of the evaluation of the driver's operation.

What is claimed is:

1. A device for controlling a vehicle, the device comprising:
a controller including:
a driving operation evaluator configured to evaluate a driver's operation of the vehicle based on an evaluation target value derived from acceleration of the vehicle;
a display controller configured to show the result of the evaluation by the driving operation evaluator on a display arranged in a cabin of the vehicle to be visually recognized by the driver;
a brake device controller configured to execute, when a predetermined brake hold condition is met while the vehicle is stationary, a brake hold control to allow a brake device to brake wheels of the vehicle to keep braking the wheels even when a brake pedal of the vehicle is not operated, and instruct the brake device to stop braking the wheels when the driver depresses an accelerator pedal of the vehicle while the brake hold control is being executed; and
a power source controller configured to control operation of a power source of the vehicle based on how far the accelerator pedal is depressed, wherein
the driving operation evaluator is configured to evaluate the driver's operation positively when the evaluation target value is equal to or less than a predetermined threshold value, or otherwise negatively when the evaluation target value is greater than the predetermined threshold value,
the device further comprises a threshold modifier configured to execute, when the accelerator pedal is depressed in a situation where the brake hold control is being executed by the brake device controller while the vehicle is stationary, a threshold modification process of increasing the predetermined threshold value for a predetermined period since the driver started to depress the accelerator pedal,
the brake device controller is configured to release a braking state of the brake device when the driver depresses the accelerator pedal, and
acceleration is generated when release of the braking state is complete.

2. The device for controlling the vehicle of claim 1, wherein
the power source is an engine,
the power source controller is configured to automatically stop the engine when a predetermined auto-stop condition, including a condition that the vehicle is stationary, is met, and to restart the engine when the accelerator pedal is depressed in a situation where the brake hold control is being executed by the brake device controller while the vehicle is stationary with the engine automatically stopped, and
the threshold modifier is configured to execute the threshold modification process when the accelerator pedal is depressed in a situation where the brake hold control is being executed by the brake device controller while the vehicle is stationary with the engine automatically stopped.

3. The device for controlling the vehicle of claim 2, wherein
the vehicle includes an automatic transmission, wherein
the threshold modifier is further configured to execute the threshold modification process when the accelerator pedal is depressed in a situation where the brake hold control is being executed by the brake device controller while the vehicle is stationary with the automatic transmission running in a power transmission state.

4. The device for controlling the vehicle of claim 3, wherein
the threshold modifier is further configured to execute the threshold modification process when the accelerator pedal is depressed in a situation where the brake hold control is being executed by the brake device controller while the vehicle is stationary on a road, of which an uphill gradient detected by a gradient detector is less than a predetermined value.

5. The device for controlling the vehicle of claim 4, wherein
the threshold modifier is further configured to execute the threshold modification process when the accelerator pedal is depressed in a situation where the brake hold control is being executed by the brake device controller while the vehicle is stationary on a road, of which a downhill gradient detected by the gradient detector is equal to or greater than a preset value.

6. The device for controlling the vehicle of claim 2, wherein
the threshold modifier is further configured to execute the threshold modification process when the accelerator pedal is depressed in a situation where the brake hold control is being executed by the brake device controller while the vehicle is stationary on a road, of which an uphill gradient detected by a gradient detector is less than a predetermined value.

7. The device for controlling the vehicle of claim 6, wherein
the threshold modifier is further configured to execute the threshold modification process when the accelerator pedal is depressed in a situation where the brake hold control is being executed by the brake device controller while the vehicle is stationary on a road, of which a downhill gradient detected by the gradient detector is equal to or greater than a preset value.

8. The device for controlling the vehicle of claim 2, wherein
the threshold modifier is further configured to execute the threshold modification process when the accelerator pedal is depressed in a situation where the brake hold control is being executed by the brake device controller while the vehicle is stationary on a road, of which a downhill gradient detected by a gradient detector is equal to or greater than a preset value.

9. The device for controlling the vehicle of claim 3, wherein
the threshold modifier is further configured to execute the threshold modification process when the accelerator pedal is depressed in a situation where the brake hold control is being executed by the brake device controller while the vehicle is stationary on a road, of which a downhill gradient detected by a gradient detector is equal to or greater than a preset value.

10. The device for controlling the vehicle of claim 1, wherein
the vehicle includes an automatic transmission, wherein
the threshold modifier is configured to execute the threshold modification process when the accelerator pedal is depressed in a situation where the brake hold control is being executed by the brake device controller while the vehicle is stationary with the automatic transmission running in a power transmission state.

11. The device for controlling the vehicle of claim 10, wherein
the threshold modifier is further configured to execute the threshold modification process when the accelerator pedal is depressed in a situation where the brake hold control is being executed by the brake device controller while the vehicle is stationary on a road, of which an uphill gradient detected by a gradient detector is less than a predetermined value.

12. The device for controlling the vehicle of claim 11, wherein
the threshold modifier is further configured to execute the threshold modification process when the accelerator pedal is depressed in a situation where the brake hold control is being executed by the brake device controller while the vehicle is stationary on a road, of which a downhill gradient detected by the gradient detector is equal to or greater than a preset value.

13. The device for controlling the vehicle of claim 10, wherein
the threshold modifier is further configured to execute the threshold modification process when the accelerator pedal is depressed in a situation where the brake hold control is being executed by the brake device controller while the vehicle is stationary on a road, of which a downhill gradient detected by a gradient detector is equal to or greater than a preset value.

14. The device for controlling the vehicle of claim 1, wherein
the threshold modifier is further configured to execute the threshold modification process when the accelerator pedal is depressed in a situation where the brake hold control is being executed by the brake device controller while the vehicle is stationary on a road, of which an uphill gradient detected by a gradient detector is less than a predetermined value.

15. The device for controlling the vehicle of claim 14, wherein
the threshold modifier is further configured to execute the threshold modification process when the accelerator pedal is depressed in a situation where the brake hold control is being executed by the brake device controller while the vehicle is stationary on a road, of which a downhill gradient detected by the gradient detector is equal to or greater than a preset value.

16. The device for controlling the vehicle of claim 1, wherein
the threshold modifier is further configured to execute the threshold modification process when the accelerator pedal is depressed in a situation where the brake hold control is being executed by the brake device controller while the vehicle is stationary on a road, of which a downhill gradient detected by a gradient detector is equal to or greater than a preset value.

* * * * *